(12) United States Patent
Wang

(10) Patent No.: US 12,118,863 B2
(45) Date of Patent: Oct. 15, 2024

(54) PAN-TILT-ZOOM CAMERA FOR OMNI-DIRECTIONAL 360-DEGREE-DETECTION AND 360-DEGREE SURVEILLANCE METHOD

(71) Applicant: Boyuhao Wang, Shenzhen (CN)

(72) Inventor: Boyuhao Wang, Shenzhen (CN)

( * ) Notice: Subject to any disclaimer, the term of this patent is extended or adjusted under 35 U.S.C. 154(b) by 246 days.

(21) Appl. No.: 17/953,441

(22) Filed: Sep. 27, 2022

(65) Prior Publication Data
US 2023/0162579 A1 May 25, 2023

(30) Foreign Application Priority Data

| Nov. 23, 2021 | (CN) | 202122871852.6 |
| Nov. 23, 2021 | (CN) | 202122872029.7 |
| Apr. 25, 2022 | (CN) | 202220959431.0 |
| Jun. 21, 2022 | (CN) | 202221522755.4 |

(51) Int. Cl.
*G08B 13/196* (2006.01)
*H04N 23/51* (2023.01)
*H04N 23/695* (2023.01)

(52) U.S. Cl.
CPC ... *G08B 13/1963* (2013.01); *G08B 13/19619* (2013.01); *H04N 23/51* (2023.01); *H04N 23/695* (2023.01)

(58) Field of Classification Search
None
See application file for complete search history.

(56) References Cited

U.S. PATENT DOCUMENTS

| 10,554,936 | B2* | 2/2020 | Swiss | G08B 13/19 |
| 11,315,399 | B2* | 4/2022 | Swiss | G08B 13/19632 |
| 2013/0169814 | A1* | 7/2013 | Liu | H04N 7/183 348/151 |
| 2016/0134846 | A1* | 5/2016 | Miller | H04N 7/183 348/151 |
| 2017/0244934 | A1* | 8/2017 | Chien | F21V 33/0052 |
| 2022/0104366 | A1* | 3/2022 | Nemoto | H05K 5/0047 |

FOREIGN PATENT DOCUMENTS

| CN | 104486543 A | 4/2015 |
| CN | 105955328 A | 9/2016 |
| CN | 112019821 A | 12/2020 |

* cited by examiner

*Primary Examiner* — Rodney E Fuller
(74) *Attorney, Agent, or Firm* — Jeenam Park

(57) ABSTRACT

A pan-tilt-zoom camera for omni-directional 360-degree-detection is provided, which includes a top cover and a bottom cover, an upper end of the top cover is connected to a screw lamp cap, the bottom cover includes an inner bracket and an outer bracket, a camera assembly is provided inside the inner bracket and the outer bracket, a circuit board is electrically connected to the camera assembly; a slide connection apparatus is provided on the inner bracket, the circuit board is electrically connected to the camera assembly through the slide connection apparatus, and the camera assembly controls the slide connection apparatus to perform 360-degree rotation; one path is to electrically connect the camera assembly and the circuit board through rotating shafts of a motor as electric connection leads, and the other path is to electrically connect the circuit board and the camera assembly through a first connection line and a wiring terminal.

19 Claims, 19 Drawing Sheets

PAN-TILT-ZOOM CAMERA FOR OMNI-DIRECTIONAL 360-DEGREE-DETECTION AND 360-DEGREE SURVEILLANCE METHOD

FIELD OF TECHNOLOGY

The present invention relates to the field of cameras. In particular, it relates to A pan-tilt-zoom camera for omni-directional 360-degree-detection and 360-degree surveillance method.

BACKGROUND

The pan-tilt-zoom is a supporting device for installing and fixing the camera. It is divided into two types: fixed and electric pan-tilt-zoom. The fixed pan-tilt-zoom is suitable for situations where the monitoring range is not large. After installing the camera on the fixed pan-tilt-zoom, you can adjust the level and tilt of the camera. After reaching the best working posture, you only need to lock the adjustment mechanism. The electric pan/tilt is suitable for scanning and monitoring a large area, and it can expand the monitoring range of the camera. However, in order to achieve 360-degree rotation, the current electric pan/tilt cameras on the market mostly use rotating mechanisms with complex structures, such as industrial multi-way slip rings, which have complex structures and high manufacturing costs. The complex structure also increases the product failure rate. Reduced reliability.

Domestic patent publication number CN209201182U relates to a panoramic cooperative control camera. A panoramic cooperative control camera includes a panoramic camera, a mounting bottom case, and a cooperative control component. In the panoramic cooperative control camera of the utility model, a shield of the panoramic camera as a whole rotates up and down through a driving motor and a conveying belt, thereby implementing the remotely electric adjustment of top and bottom viewing angles of the panoramic camera through programs and satisfying requirements for monitoring of different top and bottom viewing angles and installation heights on project fields. The innovative design of the mounting bottom case satisfies waterproofing requirements of wiring to facilitate installation and maintenance. Various forms of (ballhead camera and pan head) PTZ cooperative control cameras in the market as cooperative control components are supported, so that the product faces the market in the cooperative control form of panoramic camera+ballhead camera or panoramic camera+ pan head. In addition, private network exchange, power distribution assembly, and RS485 control interface circuit are additionally provided in the panoramic camera, reducing required power supplies and network cables from an equipment cabinet to a front-end device, thereby helping a remote control device to perform coordinated operation and work as a whole. The panoramic camera has complex structure. Therefore, when the panoramic camera fails, it needs to be repaired by professionals, with high cost.

SUMMARY

The technical problem to be resolved by the present invention is that the conventional pan head cannot implement 360-degree monitoring, or has complex structure and high cost when implementing 360-degree monitoring. In view of the above-mentioned defects of the prior art, Provide A pan-tilt-zoom camera for omni-directional 360-degree-detection and 360-degree surveillance method.

In order to solve the above-mentioned technical problems, the technical solution adopted in the present invention is:

Construction of A pan-tilt-zoom camera for omni-directional 360-degree-detection, comprising a top cover, the bottom of the top cover is connected to a bottom cover, the top cover is provided with a circuit board inside, an upper end of the top cover is connected to a screw lamp cap, the screw lamp cap is connected to mains electricity to supply power for the circuit board, the bottom cover comprises an inner bracket and an outer bracket, a camera assembly is provided inside the inner bracket and the outer bracket, and the circuit board is electrically connected to the camera assembly; a slide connection apparatus is provided on the inner bracket, the circuit board is electrically connected to the camera assembly through the slide connection apparatus to power on the camera assembly, and the camera assembly controls the slide connection apparatus to perform 360-degree rotation.

Optimization of, the camera assembly comprises a control panel and a camera controlled by the control panel, and the control panel is electrically connected with the circuit board through the slide connection apparatus.

Optimization of, the camera assembly further comprises a front cover, the control panel and the camera are provided in the front cover, and a lamp panel and a lamp controlled by the lamp panel are further provided between the front cover and the control panel.

Optimization of, the front cover is provided with a through hole through which the camera runs, the foremost end of the camera is substantially flush with the through hole, and the through hole is further provided with a lamp cover through which the camera runs to perform monitoring.

Optimization of, the slide connection apparatus comprises a motor, the motor is provided with a rotating shaft, and an end of the rotating shaft is connected to a wiring terminal; the motor is further provided with a first connection line connected to another wiring terminal, and the wiring terminal is electrically connected to the control panel of the camera through the rotating shaft and the first connection line; and when the rotating shaft rotates, the first connection line keeps in contact with the another wiring terminal.

Optimization of, the first connection line has at least two contact points with the another wiring terminal, and at least one of the contact points is in contact with the wiring terminal when the rotating shaft rotates.

Optimization of, the another wiring terminal comprises a slide adapter ring base provided on the rotating shaft, the slide adapter ring base is sleeved with a slide adapter ring, the another wiring terminal is connected to the slide adapter ring, two contact points of the first connection line are in contact with the slide adapter ring, and the slide adapter ring base is made of a non-conductive material.

Optimization of, the contact points of the first connection line are provided on two sides of the slide adapter ring and are in contact with the slide adapter ring.

Optimization of, the contact points of the first connection line are in contact with a slide adapter ring line.

Optimization of, the another wiring terminal comprises a slide adapter disc, the bottom of the slide adapter disc is provided with a conductive ring, and the first connection line is in contact with the conductive ring.

Optimization of, contact points of the first connection line and the conductive ring are provided on two sides of the rotating shaft and are in contact with the conductive ring to generate relative force.

Optimization of, the lower end of the rotating shaft of the motor is further provided with a second connection line, and the second connection line is in contact with the rotating shaft.

Optimization of, a contact portion of the second connection line is in contact with the axis of the rotating shaft.

Optimization of, the rotating shaft is provided with an insulation portion, the insulation portion is part of a surface of the rotating shaft and rotates along the rotating shaft, and the motor is further provided with a third connection line in contact with the insulation portion; and when the rotating shaft rotates, the third connection line keeps in contact with the rotating shaft to implement a counting function.

Optimization of, a contact portion of the third connection line is in contact with the axis of the rotating shaft.

Optimization of, the camera assembly further comprises a 360-degree detecting device, and the 360-degree detecting device is electrically connected to the control panel to implement 360-degree monitoring; and when the 360-degree detecting device detects an abnormality at an angle, the control panel drives the slide connection apparatus to rotate so as to make the camera align at an abnormal direction.

Optimization of, the infrared thermal camera or the radar is provided in at least two to implement 360-degree monitoring.

Optimization of, the infrared thermal camera or the radar is provided in at least two to implement 360-degree monitoring.

Optimization of, the top cover and the inner bracket are connected via a transition shell; the screw lamp cap, the top cover, and the circuit board are replaced with a power adapter, and the power adapter is connected to the transition shell to supply power for the camera assembly.

A 360-degree surveillance method, the method comprises a step of making a camera assembly electrically connect a camera and a control panel via the slide connection apparatus according to perform rotating surveillance.

The present invention has the beneficial effects: one path is to electrically connect a camera assembly and a circuit board through rotating shafts of a motor as electric connection leads, and the other path is to electrically connect the circuit board and the camera assembly through a first connection line and a wiring terminal. In this way, the camera assembly and the circuit board keep continuity of connection when the wiring terminal rotates with respect to the rotating shaft, so that the camera assembly can perform stable surveillance. A control panel energized detects abnormal signals to drive the rotating shaft of the motor to rotate. In this case, the wiring terminal is stationary with respect to the rotating shaft, implementing stable circuit smoothness and 360-degree rotation of the camera assembly, and ensuring the stability of circuits during rotation. The 360-degree rotation implemented by this structure has simple structure, low cost, and more stable monitoring.

To prevent the wiring terminal from swaying from side to side, two-point line contact is used between the first connection line and the wiring terminal, and there is some force between the first connection line and the wiring terminal. Two contact points are provided on two sides of the rotating shaft, improving stability of connection. In addition, a second connection line is connected to the rotating shaft. When an input path of the motor fails, the second connection line can also directly transmit current to a controlled panel through connection of the rotating shaft and the second connection line for circuit conduction, further improving stability.

When the controlled panel drives the motor to rotate, a small part of an insulation portion is provided on the rotating shaft. As a third connection line is in line contact with the insulation portion, the rotating shaft under rotation in contact with the insulation portion results in circuit disconnection and the rotating shaft under rotation leaving the insulation portion results in circuit conduction, implementing a counting function. Therefore, the number of rotation turns of the motor and specific rotation detection locations can be determined, facilitating return of the camera.

To implement better 360-degree surveillance, a 360-degree detecting device is provided at the bottom of the camera assembly for detection. When an abnormality is detected somewhere, an angle where abnormal signals exist is transmitted to the control panel, and the control panel drives the motor to rotate a high-definition camera to an abnormal direction for high-definition surveillance, thereby implementing 360-degree surveillance without blind angles.

BRIEF DESCRIPTION OF THE DRAWINGS

In order to more clearly illustrate the embodiments of the present invention or the technical solutions in the prior art, the present invention will be further described below with reference to the accompanying drawings and embodiments. For ordinary technical personnel, other drawings can also be obtained from these drawings without any creative effort.

DESCRIPTION OF THE EMBODIMENTS

In order to make the purposes, technical solutions and advantages of the embodiments of the present invention clearer, the following will be described clearly and completely in combination with the technical solutions in the embodiments of the present invention. Obviously, the described embodiments are part of the embodiments of the present invention, and not all examples. Based on the embodiments of the present invention, all other embodiments obtained by those of ordinary skill in the art without creative work fall within the protection scope of the present invention.

Figure 1:
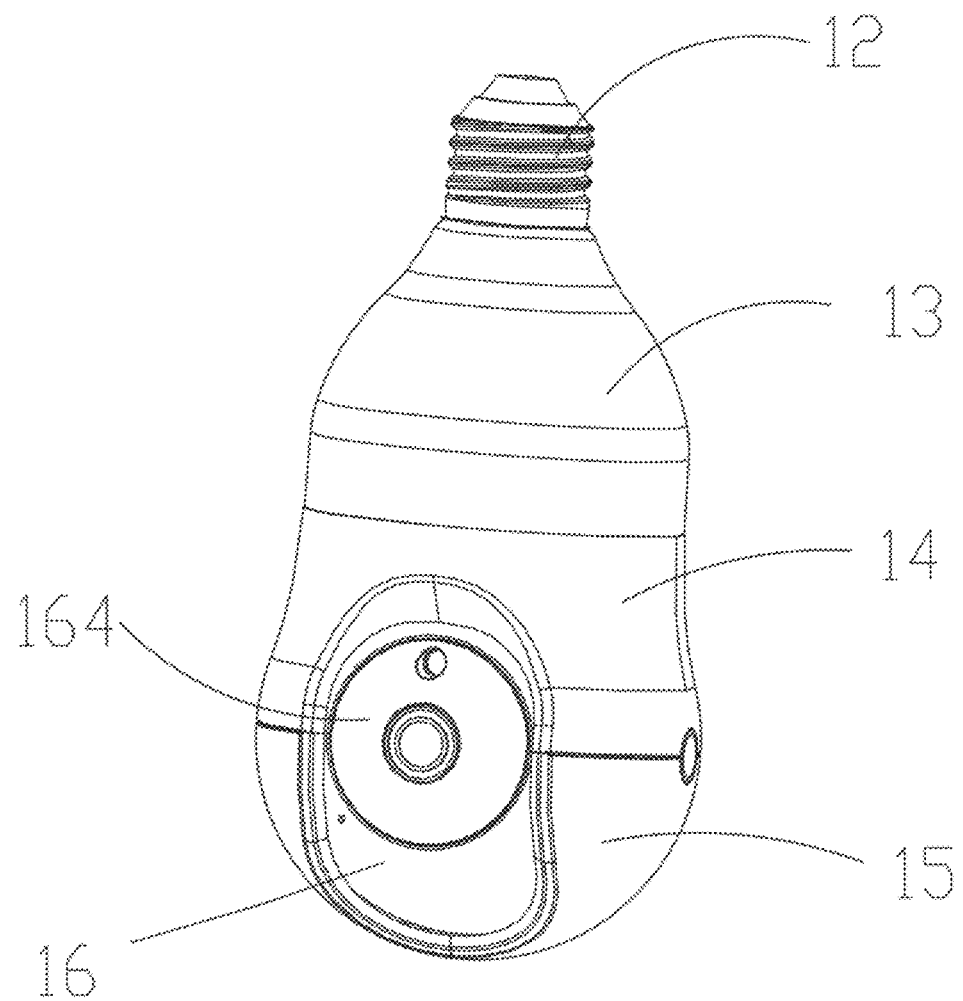
FIG. 1 is the first preferred embodiment of the present invention a three-dimensional diagram of a pan-tilt-zoom camera.
Figure 2:
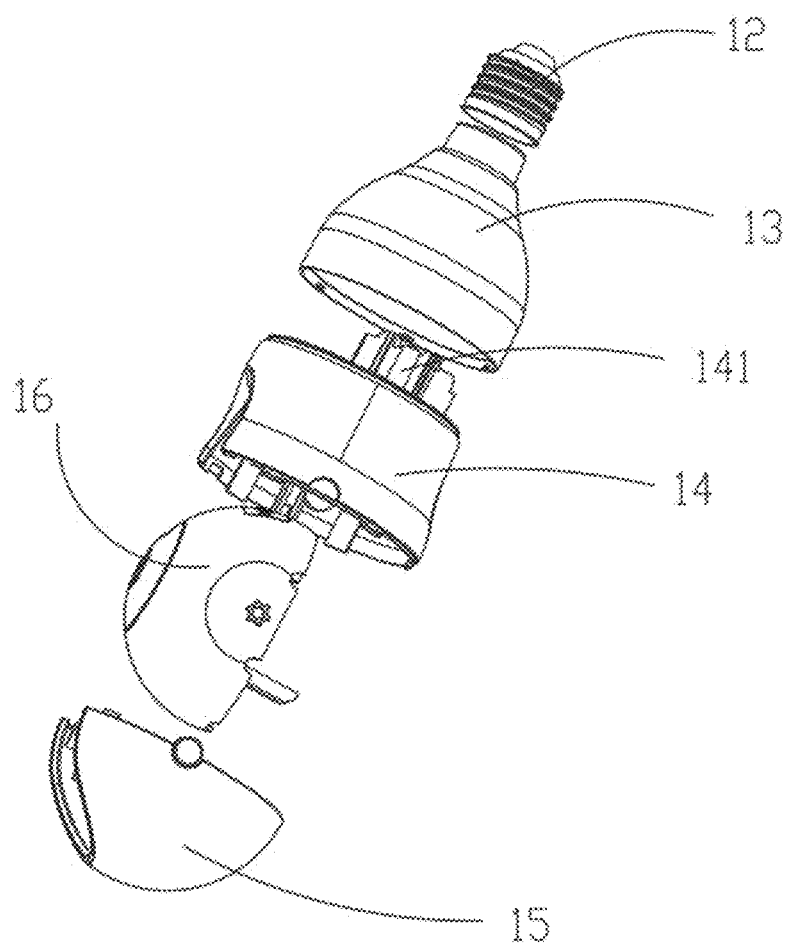
FIG. 2 is the first preferred embodiment of the present invention an exploded view of a pan-tilt-zoom camera.

A pan-tilt-zoom camera for omni-directional 360-degree-detection, according to the embodiment 1 of the present invention: as shown in FIG. 1 and FIG. 2, a pan-tilt-zoom camera includes a top cover 13, where the top cover 13 is connected to a screw lamp cap 12 to supply power for the camera, the lower end of the top cover 13 is connected to an inner bracket 14, the bottom of the inner bracket 14 is connected to an outer bracket 15, a cavity for accommodating a camera assembly 16 is formed in the inner bracket 14 and the outer bracket 15, the camera assembly 16 is provided therein, and the outer bracket 15 is provided with a mouth to expose the camera assembly 16. The inner bracket 14 is further provided with a motor connection base 141 for accommodating a slide connection apparatus 18, and the slide connection apparatus 18 is secured onto the motor connection base 141. In use, the screw lamp cap 12 is connected to mains electricity, and the mains electricity is reduced to 5V to 12V through a circuit board 19 inside the top cover 13. Two ends of the circuit board 19 are connected to the slide connection apparatus 18 and then the circuit board 19 is connected to the camera assembly 16 through the slide connection apparatus 18, to supply power for the camera assembly 16. When the camera assembly 16 needs to rotate, the camera assembly 16 drives the slide connection apparatus 18 to rotate, implementing 360-degree monitoring and ensuring stability of connection.

Figure 3:
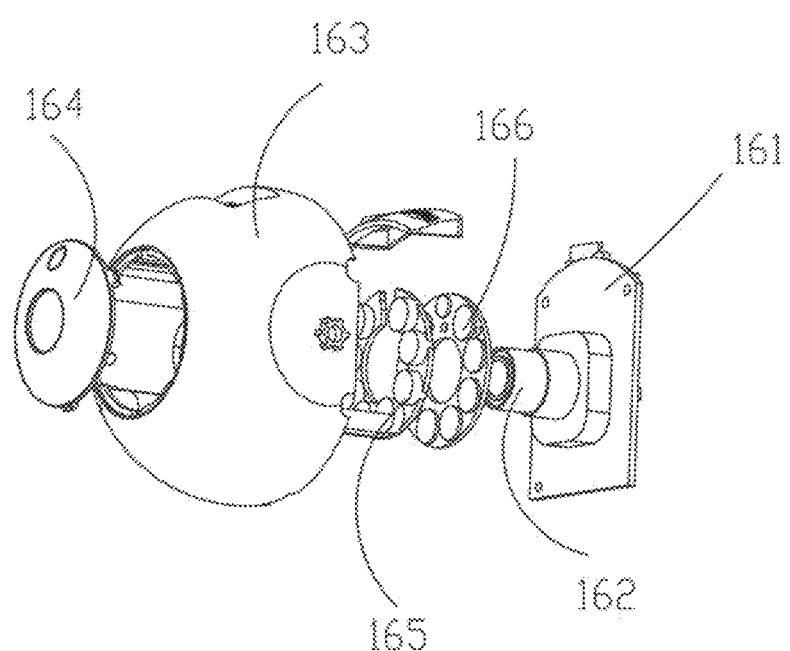
FIG. 3 is the first preferred embodiment of the present invention an exploded view of a camera assembly.

Further, as shown in FIG. 3, the camera assembly 16 includes a control panel 161, two ends of the control panel 161 being connected to the slide connection apparatus 18; and a camera 162 for monitoring, the camera 162 electrically connected to the control panel 161. The camera assembly 16 further includes a front cover 163 to secure the control panel 161. To improve the working efficiency of the camera assembly 16, the camera assembly 16 is further provided with a lamp panel 166 connected to the control panel 161 and a lamp 165 providing lighting, where the lamp 165 and the lamp panel 166 are electrically connected and provided between the control panel 161 and the front cover 163, the camera 162 runs through the lamp panel 166 and the lamp 165, and the front end of the camera 162 is flush with the front cover 163. The front cover 163 is further provided with a lamp cover 164 to improve the lighting effect and prevent dust from entering the camera assembly 16.

Further, as shown in FIG. 4 to FIG. 7, the slide connection apparatus 18 includes a motor 1, where the motor 1 is provided with a rotating shaft 100, a slide adapter ring base 5 is connected above the rotating shaft 100, the periphery of the slide adapter ring base 5 is connected to a slide adapter ring 4, the slide adapter ring base 5 rotates along with the rotating shaft 100, and the slide adapter ring 4 rotates with respect to the slide adapter ring base 5. Therefore, when the rotating shaft 100 rotates, the slide adapter ring 4 may be stationary with respect to the rotating shaft 100. A wiring terminal a9 is connected above the rotating shaft 100, and a wiring terminal b10 is connected above the slide adapter ring 4, where the slide adapter ring 4 is made of a conductive material, and the slide adapter ring base 5 is made of a non-conductive material, such as plastic. The wiring terminal a9 and the wiring terminal b10 being connected to the circuit board 19 leads to conduction of the circuit board 19 and the camera assembly 16. When height of the slide adapter ring base 5 is higher than a total height of the slide adapter ring 4 and the wiring terminal b10, the inner wall of the wiring terminal b10 being placed on the slide adapter ring 4 is in contact with the periphery of the slide adapter ring base 5, preventing the inner wall of the wiring terminal b10 from being in contact with the rotating shaft 100. An upper end of the motor 1 is further provided with a first connection line 71, one end of the first connection line 71 is provided on two sides of the slide adapter ring 4 and in contact with the slide adapter ring 4, the other end thereof is connected to a wiring socket 6, and the wiring socket 6 is eclectically connected to the control panel 161. Therefore, when the rotating shaft 100 rotates, the first connection line 71 is connected to the wiring terminal b10 through the slide adapter ring 4.

Figure 4:
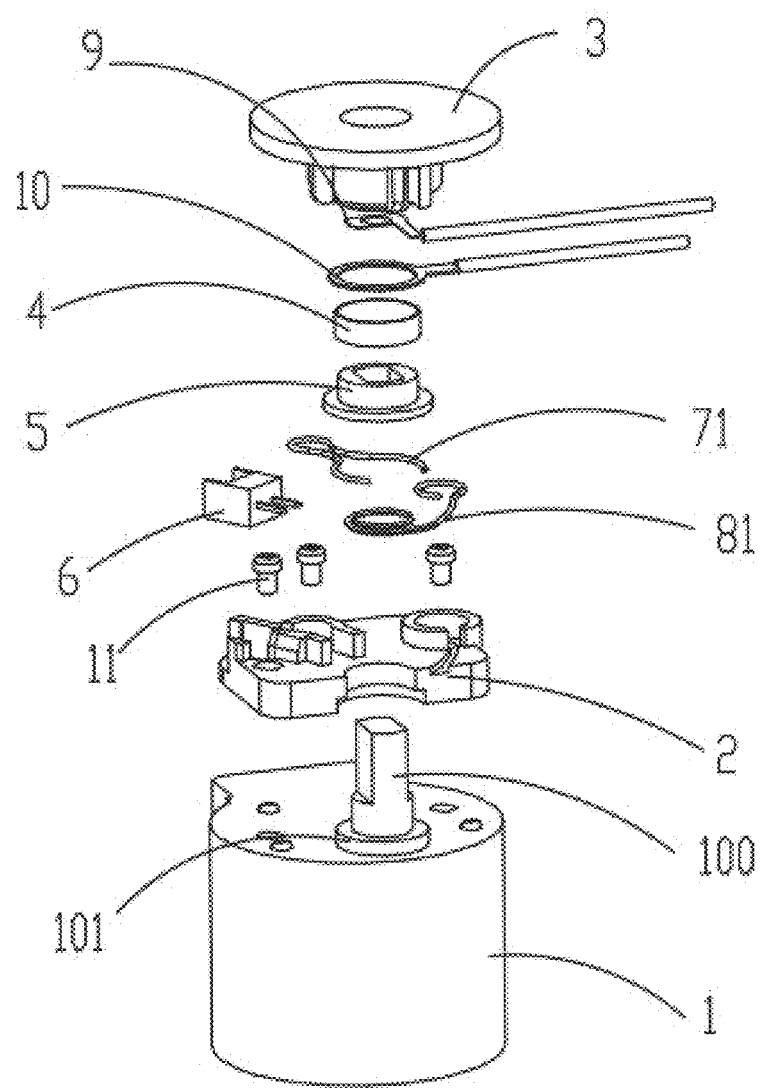
FIG. 4 is the first preferred embodiment of the present invention an exploded view of a slide connection apparatus.
Figure 5:
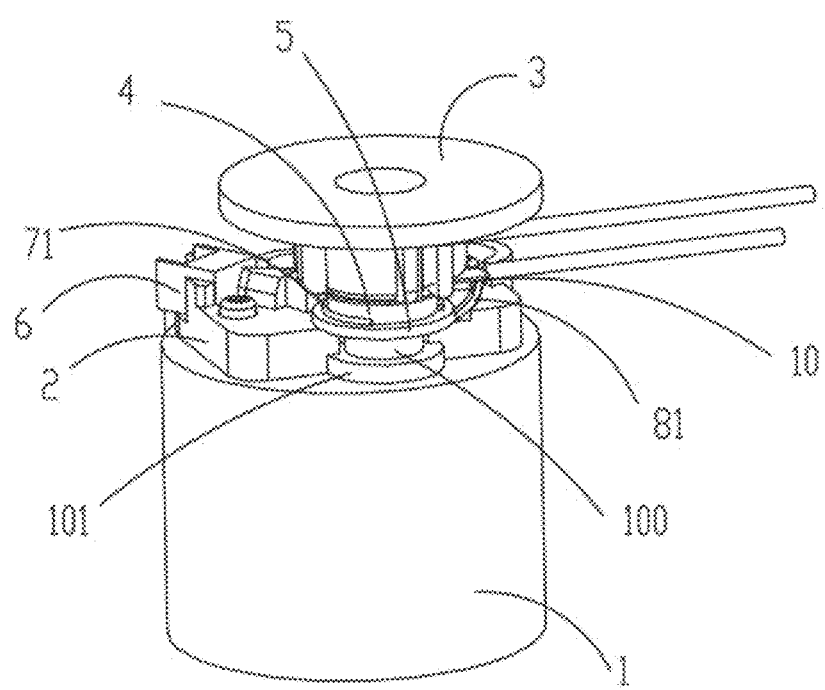
FIG. 5 is the first preferred embodiment of the present invention a three-dimensional diagram of a slide connection apparatus.
Figure 6:
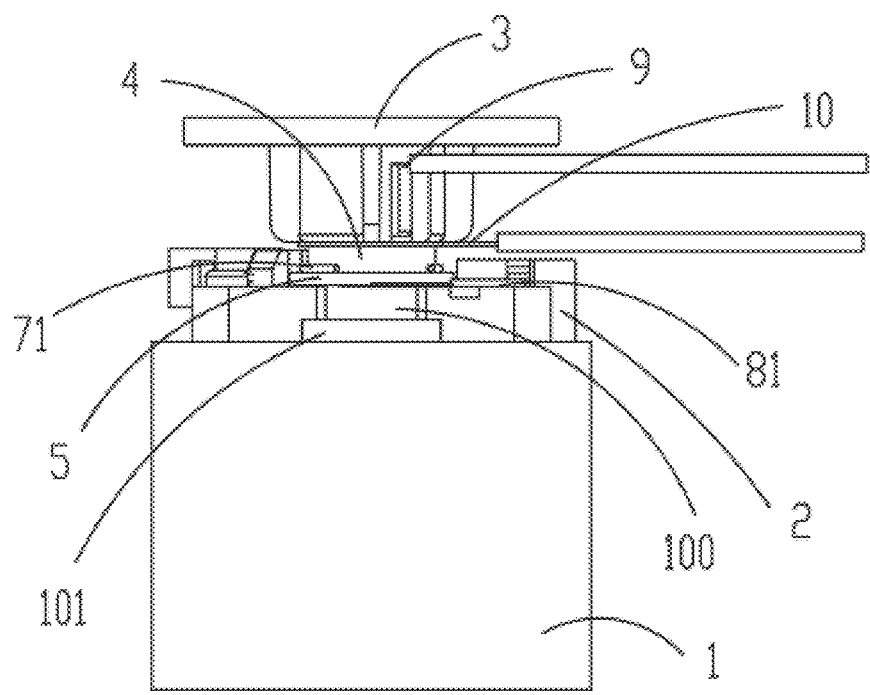
FIG. 6 is the first preferred embodiment of the present invention an isometric view of a slide connection apparatus.

Further, as shown in FIG. 4 to FIG. 6, the slide connection apparatus 18 is further provided with a second connection line 81 to increase the stability of connection. An end of the second connection line 81 being slidably connected to the rotating shaft 100 keeps the second connection line 81 in contact with the rotating shaft 100 under rotation; and when the rotating shaft 100 is energized, a circuit is connected through the second connection line 81, without transmitting another current to the control panel 161 through electrical connection of the rotating shaft 100 and the second connection line 81 when circuit transmission in the motor fails, thereby improving the stability of a camera channel.

Further, as shown in FIG. 4 to FIG. 7, a fixing bracket 2 is provided above the motor 1 and detachably connected to the motor 1 through a screw 11. The other end of the first connection line 71 and the other end of the second connection line 81 are secured onto the fixing bracket 2. The wiring socket 6 is also provided on the fixing bracket 2 and connected to the first connection line 71.

Further, As shown in FIG. 4 to FIG. 9, a base bracket 3 is connected to the motor 1, and the base bracket 3 is connected to the rotating shaft 100 through the screw 11, so that the wiring terminal a9 is in close contact with the rotating shaft 100.

Figure 7:
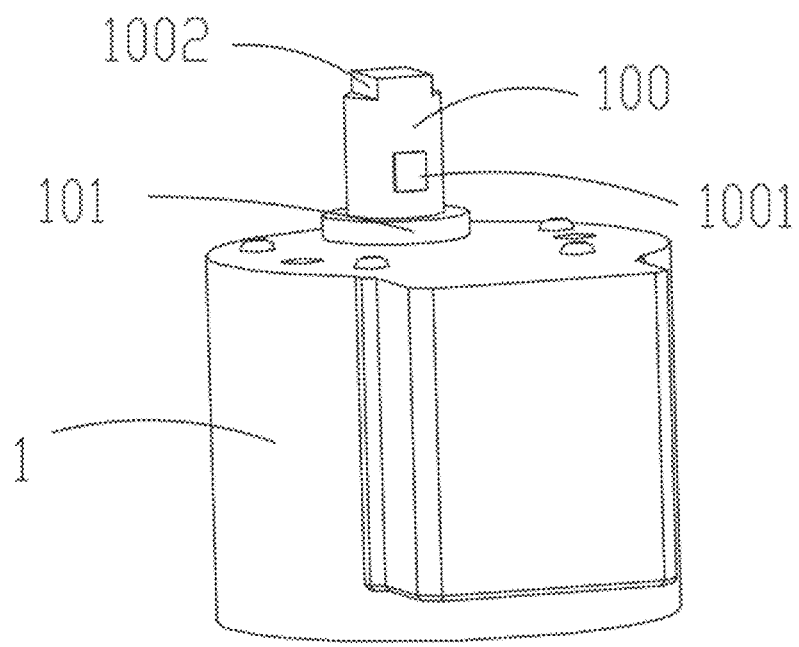
FIG. 7 is the first preferred embodiment of the present invention a three-dimensional diagram of a motor structure.

Further, as shown in FIG. 7, a standby contact ring 101 is provided at the bottom of the rotating shaft 100 and connected to the second connection line 81, so that the rotating shaft 100 is connected to the second connection line 81. An inward connecting platform 1002 is provided above the rotating shaft 1X), the slide adapter ring base 5 is provided with a through hole corresponding to the connecting platform 1002, and the slide adapter ring base 5 is inserted into the connecting platform 1002 via the through hole.

Figure 8:
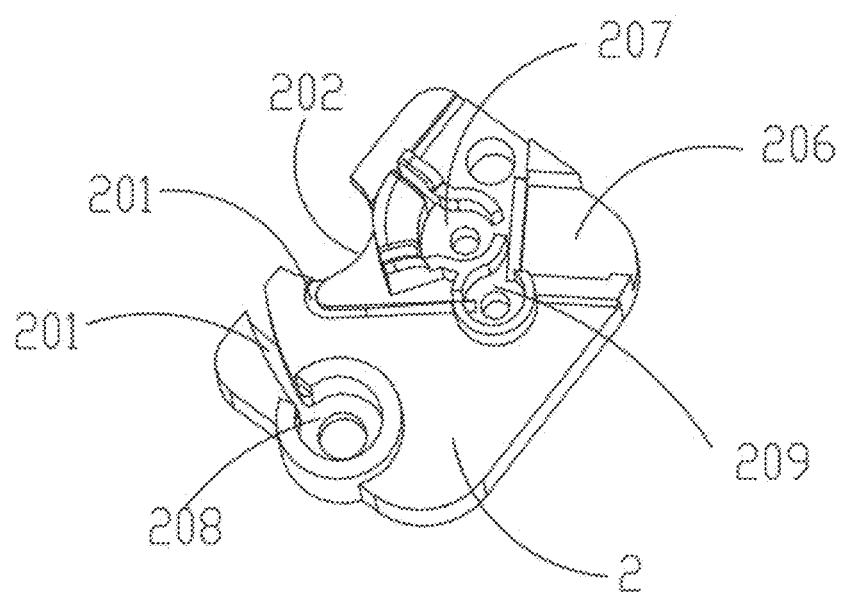
FIG. 8 is the first preferred embodiment of the present invention a three-dimensional diagram of a fixing bracket.
Figure 9:
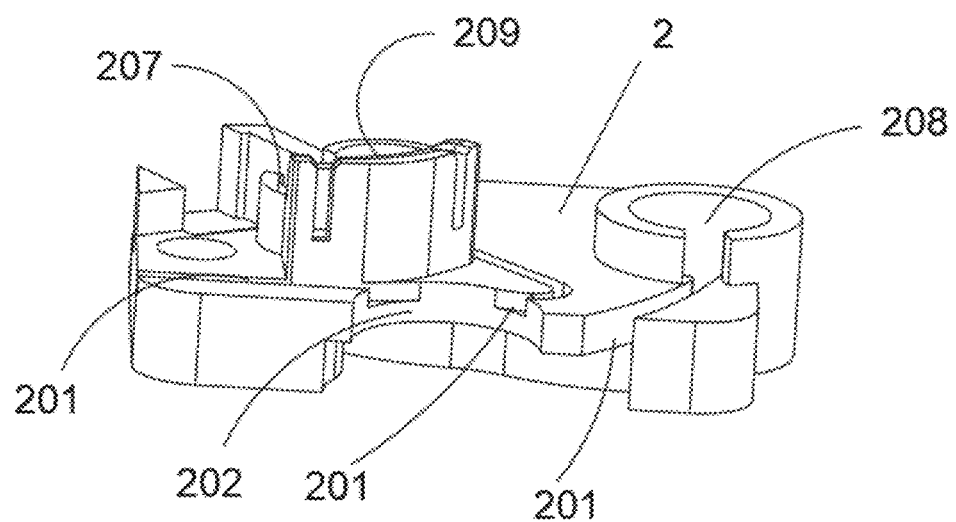
FIG. 9 is the first preferred embodiment of the present invention a three-dimensional diagram of a fixing bracket.

Further, as shown in FIG. 8 to FIG. 9, the fixing bracket 2 is provided with an arc notch 202 close to the rotating shaft 100, a first connection line base 207 to fix the first connection line 71, a second connection line base 208 to fix the second connection line 81, a wiring socket base 206 to connect the wiring socket 6, and a wiring channel 201 connected to the first connection line base 206 and the second connection line base 208, where the first connection line 71 and the second connection line 81 each run through the wiring channel 201, and the wiring channel 201 connected to the second connection line base 208 is always connected to the bottom of the fixing bracket 2, so that the second connection line 81 is connected to the standby contact ring 101.

Figure 10:
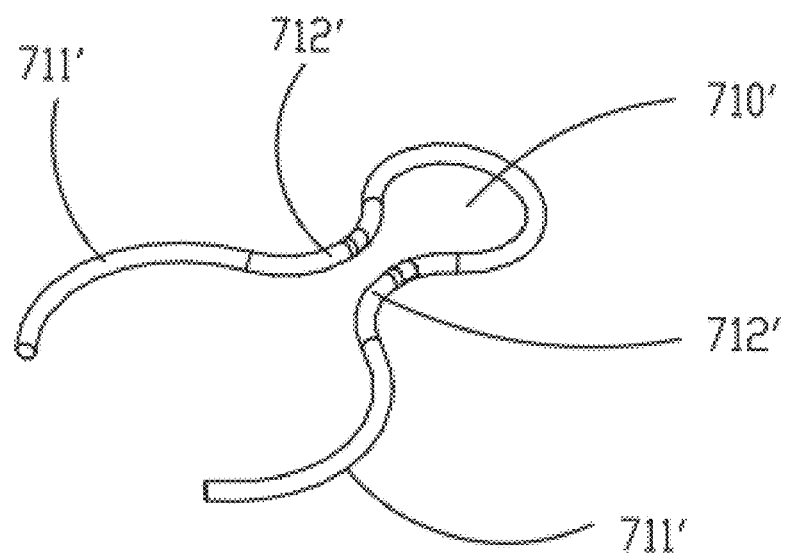
FIG. 10 is the first preferred embodiment of the present invention a schematic diagram of a first connecting line.

Further, as shown in FIG. 10, the first connection line 71 includes a first locking portion 710', two connecting portions 712' connected to the first locking portion 710', and two first contact portions 711' provided on ends of the two connecting portions 712', where the two first contact portions 711' are loop-shaped and are in contact with the slide adapter ring 4, and encircle the slide adapter ring 4, so that the slide adapter ring 4 can be connected to one of the first contact portions 711' even when swaying from side to side, implementing continuous conduction of the circuit. The two first contact portions 711' may also be straight, and the straight contact portion has better contact effect than the loop-shaped contact portion.

Figure 11:
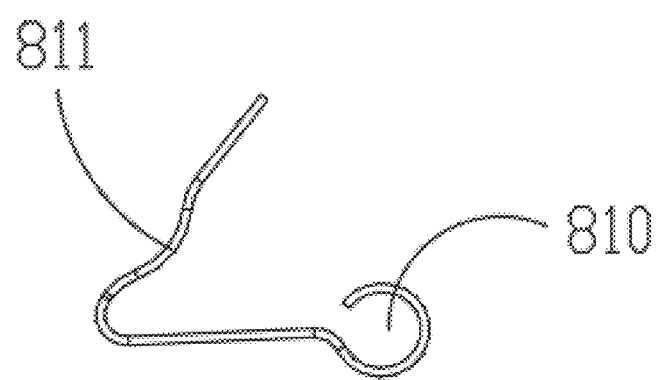
FIG. 11 is a schematic diagram of a second connecting line.

Further, as shown in FIG. 11, the second connection line 81 includes a second locking portion 810 and a second contact portion 811 connected to the second locking portion 810, where the second contact portion 811 runs through the wiring channel 201 to the bottom of the fixing bracket 2 and then is connected to the standby contact ring 101. In addition, there is some relative force between the second contact portion 811 and the standby contact ring 101 to keep the second contact portion 811 in contact with the standby contact ring 101. For better connection, the second contact portion 811 is in line contact with the standby contact ring 101.

In use, the screw lamp cap 12 is connected to mains electricity, the mains electricity is reduced to 5V to 12V through the circuit board 19, the wiring terminal is connected to the circuit board 19, current is conducted to the slide adapter ring 4 through the wiring terminal b10, the slide adapter ring 4 is connected to the first connection line 71, and the other end of the first connection line 71 is connected to the wiring socket 6. The wiring socket 6 is electrically connected to the control panel 161. The other end of the current is connected to the rotating shaft 100 through the wiring terminal a9, conducted to the motor 1 by the rotating shaft 100, and then connected to another electrode of the control panel 161, to energize the control panel 161. Therefore, the camera assembly 16 energized can perform surveillance. When the camera assembly 16 finds an abnormality at an angle, the control panel 161 sends a rotation signal to the motor 1. In this case, the rotating shaft 100 of the motor 1 rotates to make the camera assembly 16 face toward the abnormal direction, and the slide adapter ring 4 is stationary with respect to the rotating shaft 100, without affecting connection of the wiring terminal b10 and the slide adapter ring 4. Then, current is transmitted to the control panel 161 through the first connection line 71, implementing continuous rotation of the rotating shaft 100 without affecting conduction of current, which improves the stability of monitoring during rotation. To avoid undesirable contact of the motor 1 and the control panel 161, the second connection line 81 is connected to the rotating shaft 100 to transmit current of the wiring terminal a9 to the control panel 161 through the second connection line 81, and the second connection line 81 is in contact with a line in sliding connection to the rotating shaft 100, avoiding disconnection of the rotating shaft 100 and the second connection line 81 when the rotating shaft 100 rotates.

Figure 12:
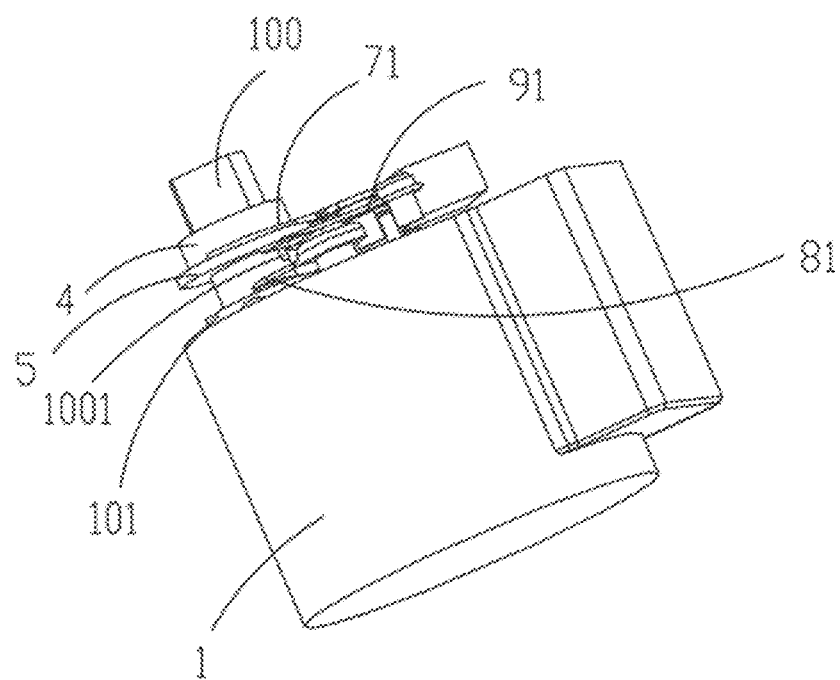
FIG. 12 is the second preferred embodiment of the present invention a three-dimensional schematic diagram of a slide connection apparatus.
Figure 13:
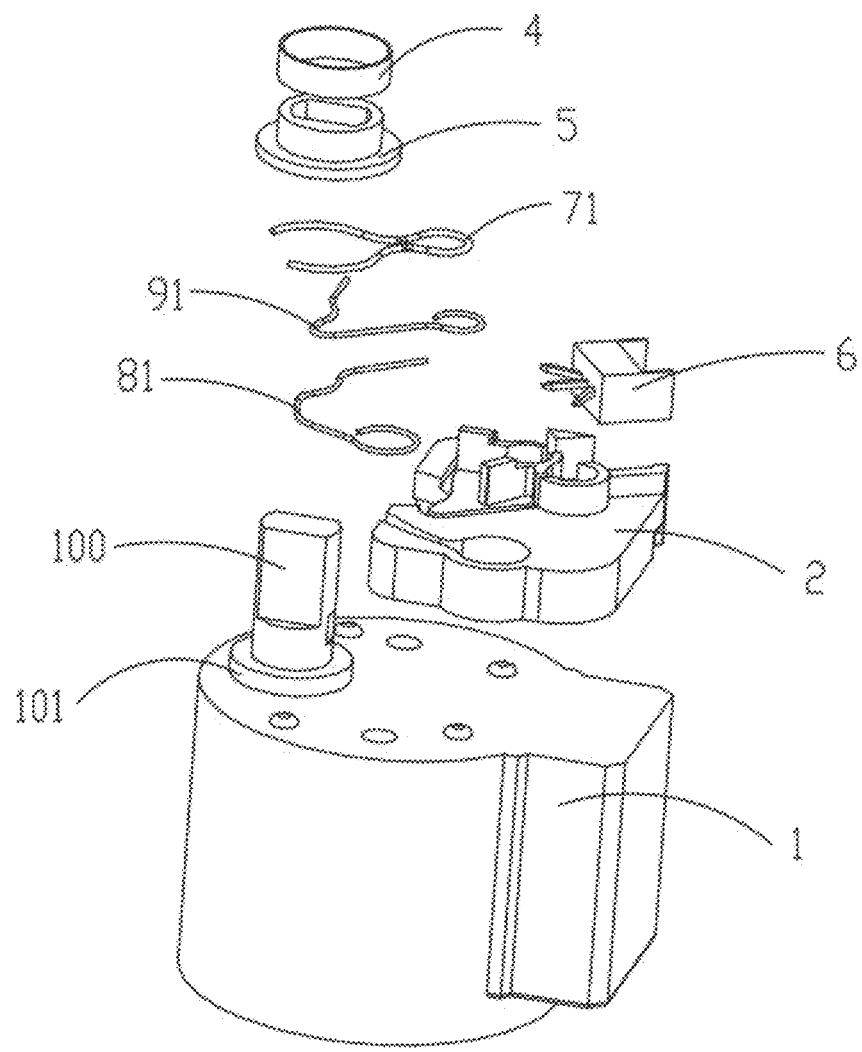
FIG. 13 is the second preferred embodiment of the present invention a schematic exploded view of a slide connection apparatus.
Figure 14:
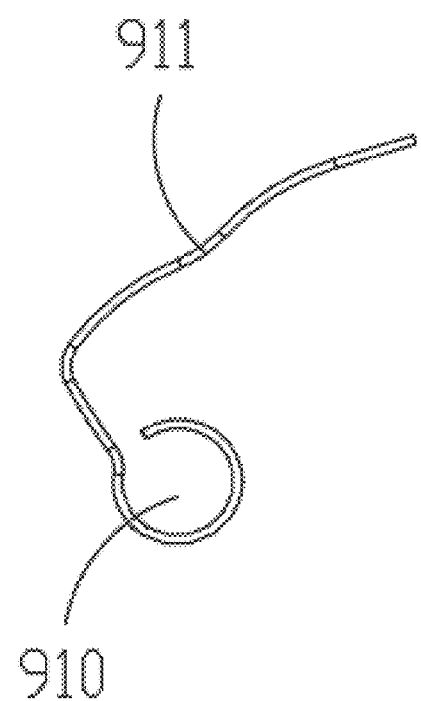
FIG. 14 is the second preferred embodiment of the present invention a three-dimensional schematic diagram of a third connecting line.

A pan-tilt-zoom camera for omni-directional 360-degree-detection, according to the embodiment 2 of the present invention: Embodiment 2 is based on Embodiment 1. As shown in FIG. 12 to FIG. 14, an upper part of the rotating shaft 100 is provided with an insulation portion 1001, the fixing bracket 2 is provided with a third connection line 91 in contact with the insulation portion 1001, and the other end of the third connection line is secured onto the fixing bracket 2; the insulation portion 1001 rotates along with the rotating shaft 100; and the insulation portion 1001 in contact with the third connection line 91 results in line disconnection, implementing a counting function. Thus, the number of rotation turns of the rotating shaft 100 and specific rotation detection locations can be determined according to the disconnection frequency of the third connection line 91, facilitating callback and return of the camera. The third connection line 91 includes a third locking portion 910, where the third locking portion 910 is secured onto a third locking portion base 209, a third contact portion 911 is in sliding contact with the rotating shaft 100 where the insulation portion 1001 is located through the wiring channel 201, and the third contact portion 911 is in line contact with the rotating shaft 100.

Figure 15:
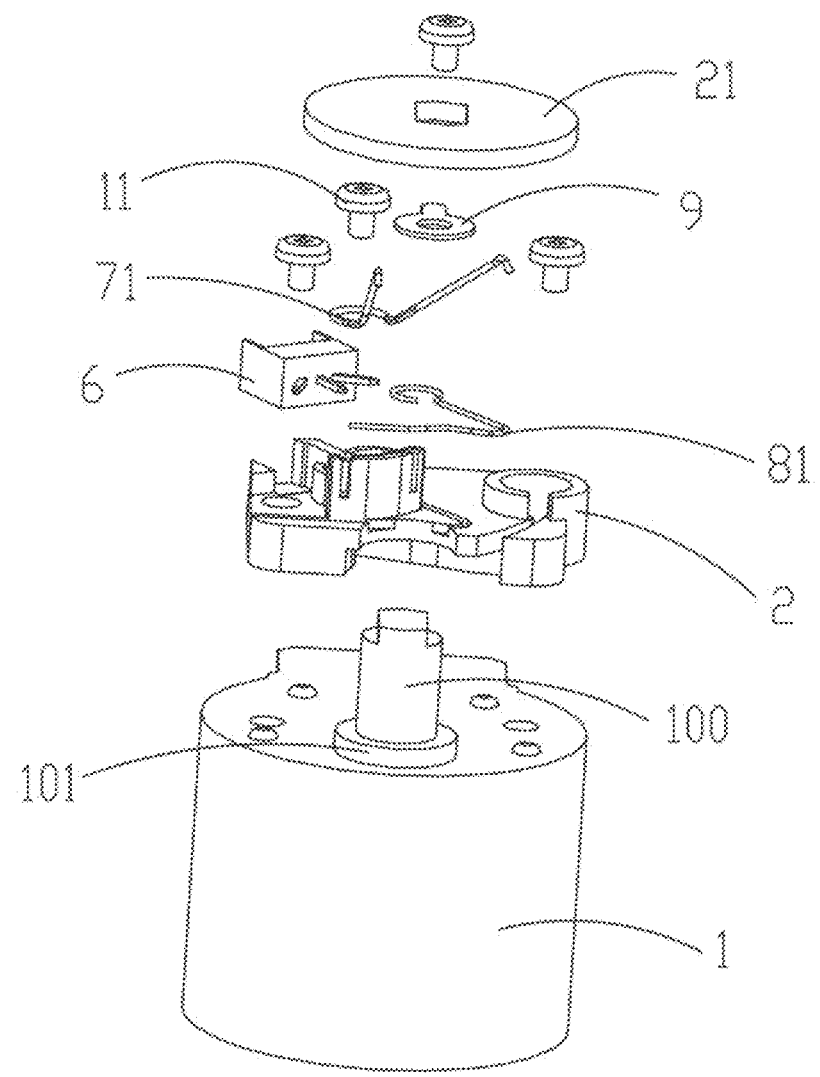
FIG. 15 is the third preferred embodiment of the present invention a schematic exploded view of a slide connection apparatus.

A pan-tilt-zoom camera for omni-directional 360-degree-detection, according to the embodiment 3 of the present invention, as shown in FIG. 15, is the same as Embodiment 1 except for connection of the first connection line 71 and the wiring terminal. The rotating shaft 100 is connected to a slide adapter disc 21, the bottom of the slide adapter disc 21 is provided with a conductive ring (not shown in the figure), the conductive ring is connected to one end of the circuit board, the other end of the circuit board is connected via the wiring terminal a9, the first connection line 71 is connected to the conductive ring to perform conduction, and current is connected to the conductive ring through the slide adapter disc 21 and then is in contact with the first connection line 71 to implement current conduction.

Figure 16:
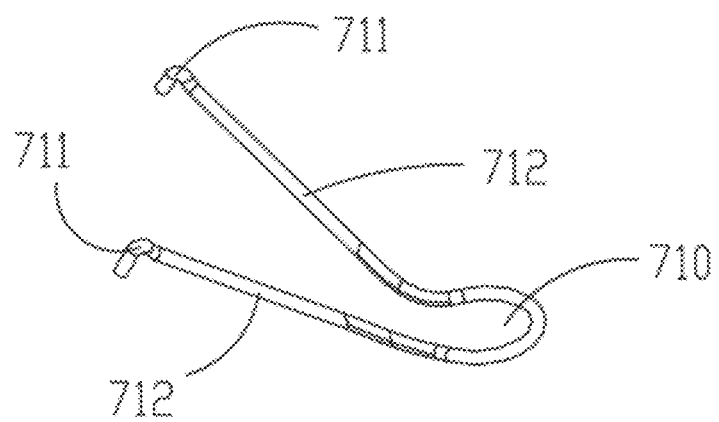
FIG. 16 is the third preferred embodiment of the present invention a schematic diagram of a first connecting line.
Figure 17:
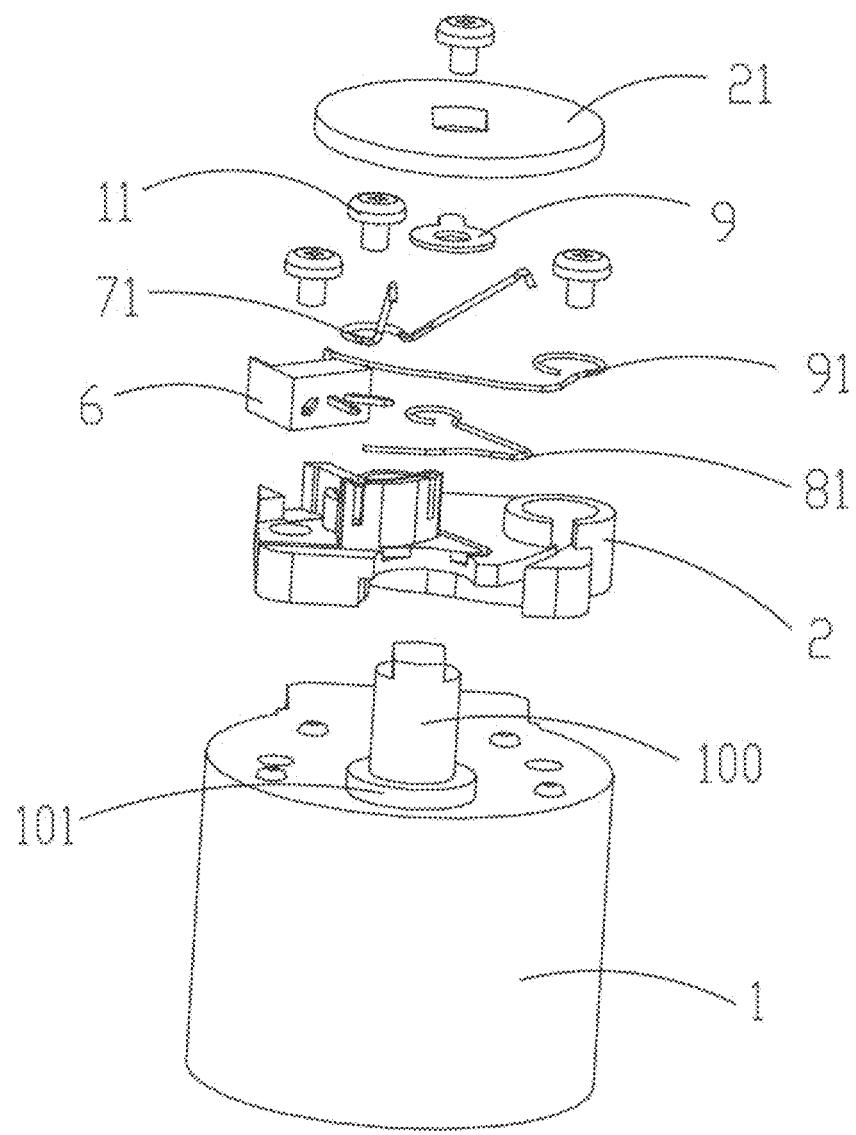
FIG. 17 is the fourth preferred embodiment of the present invention a schematic exploded view of a slide connection apparatus.

Further, as shown in FIG. 16, a connecting portion 712 of the first connection line 71 is inclined upward to allow a first contact portion 711 and a first locking portion 710 to be located in different horizontal planes. In the present invention, the first contact portion 711 is provided above the first locking portion 710, and then two first contact portions 711 are in contact with the conductive ring. To prevent the slide adapter disc 21 from swaying from side to side, the two first contact portions 711 are provided on two sides of the rotating shaft 100 and connected to the conductive ring, without disconnecting the slide adapter disc 21 from the first connection line 711 while such disconnection is resulted from sway of the slide adapter disc 21.

A pan-tilt-zoom camera for omni-directional 360-degree-detection, according to the embodiment 4 of the present invention, as shown in FIG. 4, is additionally provided with a structure having the counting function described in Embodiment 2 based on Embodiment 3, to implement the counting function. With a same structure provided, this is not specifically explained herein.

Figure 18:
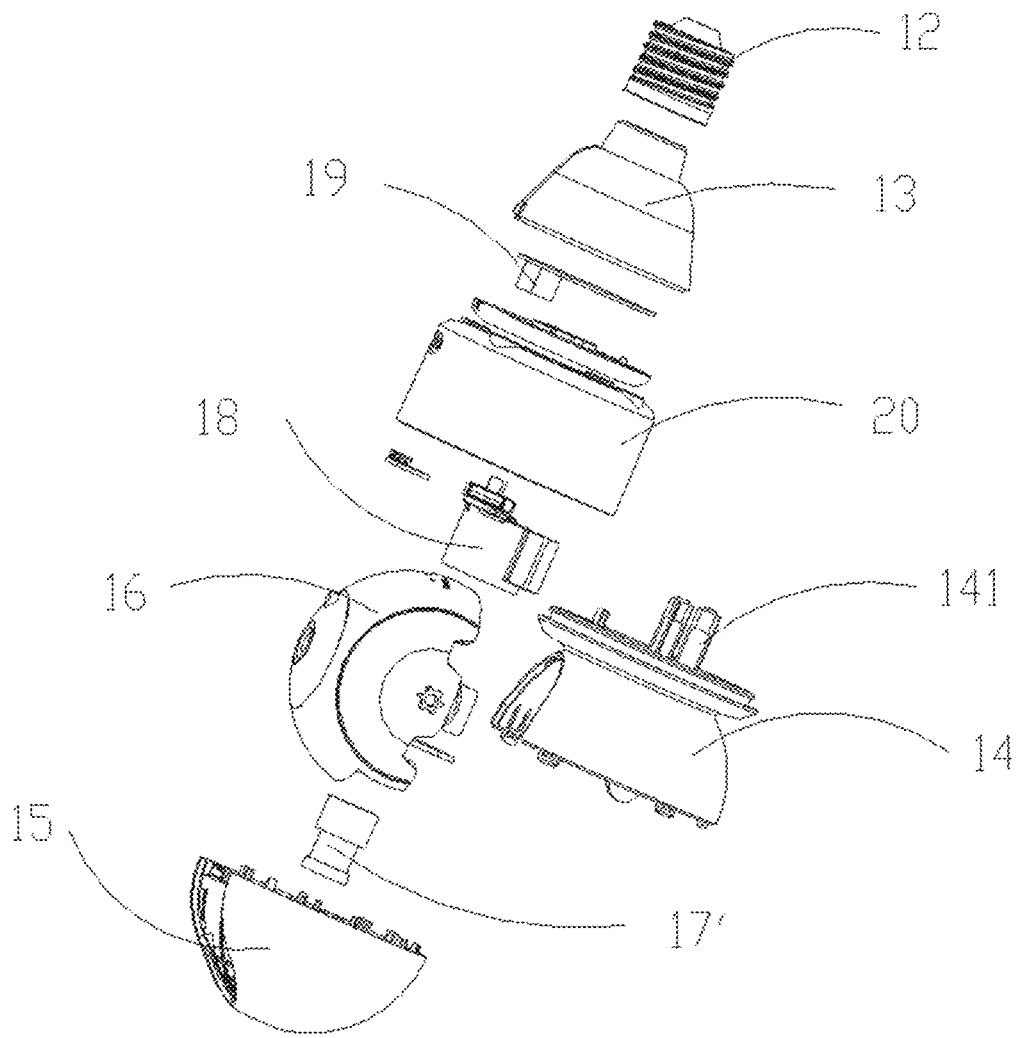
FIG. 18 is the fifth preferred embodiment of the present invention an exploded view of a pan-tilt-zoom camera of a panoramic camera.

A pan-tilt-zoom camera for omni-directional 360-degree-detection, according to the embodiment 5 of the present invention, as shown in FIG. 18, is the same as Embodiment 1, except that a transition shell 20 is provided between the top cover 13 and the inner bracket 14. The screw lamp cap 12, the top cover 13, and the circuit board 19 are replaced with the transition shell 20, where the transition shell 20 is connected to an external power adapter, and therefore voltage from the power adapter is 5V to 12V.

Further, as shown in FIG. 18, the camera assembly 16 further includes a panoramic camera 17', where the panoramic camera IT is connected to the control panel 161 and located at a position facing toward the ground; and the panoramic camera 17' can implement 360-degree detection without rotation. However, because the panoramic camera 17' has low definition, signals are transmitted to the control panel 161 when the panoramic camera 17' detects an abnormality in a direction, and the control panel 161 drives the motor 1 to rotate the camera assembly 16 until the camera 162 aligns at the abnormal direction for high-definition surveillance. With the structure of the slide connection apparatus 18, occasional disconnection of the circuit during rotation is avoided, thereby ensuring stability of surveillance. It should be noted that the slide connection apparatus 18 described in Embodiment 2 to Embodiment 4 may also be applied to Embodiment 5.

Figure 19:
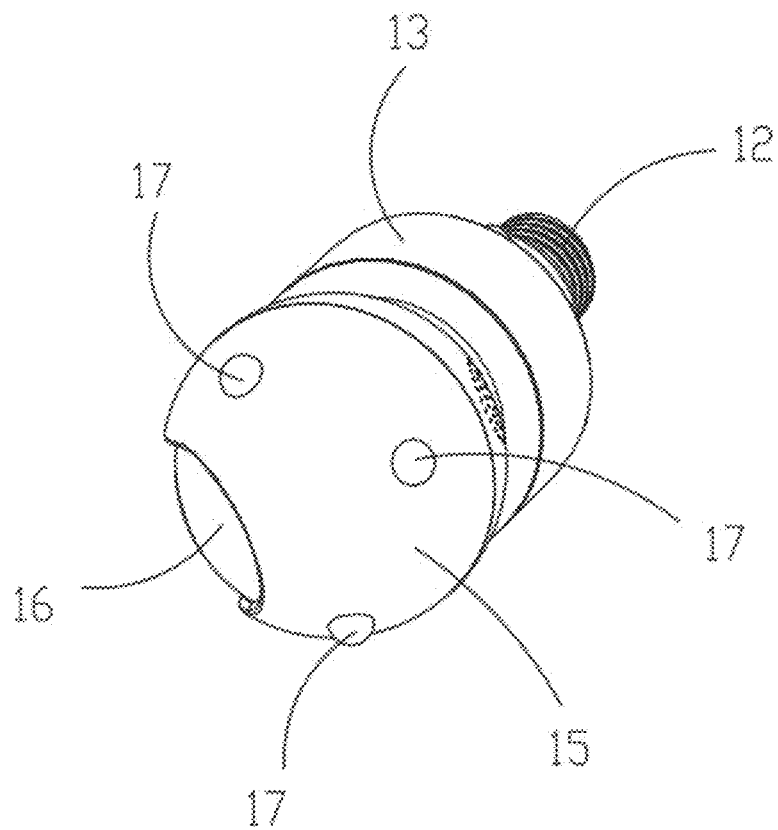
FIG. 19 is the sixth preferred embodiment of the present invention an isometric view of a pan-tilt-zoom camera of an infrared camera.

A pan-tilt-zoom camera for omni-directional 360-degree-detection, according to the embodiment 6 of the present invention: as shown in FIG. 19, the panoramic camera 17' is replaced with an infrared thermal camera 17, and three infrared thermal cameras 17 are provided to implement 360-degree surveillance.

Further, as shown in FIG. 19, an included angle between the infrared thermal cameras 17 is 90 degrees to implement better 360-degree detection. The infrared thermal camera 17 may alternatively be replaced with a radar to implement 360-degree detection.

The present invention further provides a 360-degree surveillance method, where the method includes a step of making a camera assembly 16 electrically connect a circuit board 19 and a control panel 161 via the slide connection apparatus 18.

It should be understood that the present invention has been described by some embodiments, and those skilled in the art will recognize that various changes or equivalents may be made to these features and embodiments without departing from the spirit and scope of the present invention, replace. In addition, in the teachings of this invention, these features and embodiments may be modified to adapt a particular situation and material without departing from the spirit and scope of the invention. Therefore, the present invention is not limited by the specific embodiments disclosed herein, and all embodiments falling within the scope of the claims of the present application fall within the protection scope of the present invention.

What is claimed is:

1. A pan-tilt-zoom camera for omni-directional 360-degree-detection, comprising a top cover, wherein a bottom of the top cover is connected to a bottom cover, the top cover is provided with a circuit board inside, an upper end of the top cover is connected to a screw lamp cap, the screw lamp cap is connected to mains electricity to supply power for the circuit board, the bottom cover comprises an inner bracket and an outer bracket, a camera assembly is provided inside the inner bracket and the outer bracket, and the circuit board is electrically connected to the camera assembly; wherein a slide connection apparatus is provided on the inner bracket, the circuit board is electrically connected to the camera assembly through the slide connection apparatus to power on the camera assembly, and the camera assembly controls the slide connection apparatus to perform 360-degree rotation; wherein the slide connection apparatus comprises a motor, wherein the motor is provided with a rotating shaft, and an end of the rotating shaft is connected to a wiring terminal; the motor is further provided with a first connection line connected to another wiring terminal, and the wiring terminal is electrically connected to a control panel of the camera through the rotating shaft and the first connection line; and when the rotating shaft rotates, the first connection line keeps in contact with the another wiring terminal.

2. The pan-tilt-zoom camera according to claim 1, wherein the camera assembly comprises the control panel and the camera controlled by the control panel, and the control panel is electrically connected with the circuit board through the slide connection apparatus.

3. The pan-tilt-zoom camera according to claim 2, wherein the camera assembly further comprises a front cover, the control panel and the camera are provided in the front cover, and a lamp panel and a lamp controlled by the lamp panel are further provided between the front cover and the control panel.

4. The pan-tilt-zoom camera according to claim 3, wherein the front cover is provided with a through hole through which the camera runs, the foremost end of the camera is substantially flush with the through hole, and the through hole is further provided with a lamp cover through which the camera runs to perform monitoring.

5. The pan-tilt-zoom camera according to claim 1, wherein the first connection line has at least two contact points with the another wiring terminal, and at least one of the contact points is in contact with the wiring terminal when the rotating shaft rotates.

6. The pan-tilt-zoom camera according to claim 5, wherein the another wiring terminal comprises a slide adapter ring base provided on the rotating shaft, the slide adapter ring base is sleeved with a slide adapter ring, the another wiring terminal is connected to the slide adapter ring, two contact points of the first connection line are in contact with the slide adapter ring, and the slide adapter ring base is made of a non-conductive material.

7. The pan-tilt-zoom camera according to claim 6, wherein the contact points of the first connection line are provided on two sides of the slide adapter ring and are in contact with the slide adapter ring.

8. The pan-tilt-zoom camera according to claim 7, wherein the contact points of the first connection line are in contact with a slide adapter ring line.

9. The pan-tilt-zoom camera according to claim 1, wherein the another wiring terminal comprises a slide adapter disc, a bottom of the slide adapter disc is provided with a conductive ring, and the first connection line is in contact with the conductive ring.

10. The pan-tilt-zoom camera according to claim 9, wherein contact points of the first connection line and the conductive ring are provided on two sides of the rotating shaft and are in contact with the conductive ring to generate relative force.

11. The pan-tilt-zoom camera according to claim 1, wherein a lower end of the rotating shaft of the motor is further provided with a second connection line, and the second connection line is in contact with the rotating shaft.

12. The pan-tilt-zoom camera according to claim 11, wherein a contact portion of the second connection line is in contact with an axis of the rotating shaft.

13. The pan-tilt-zoom camera according to claim 1, wherein the rotating shaft is provided with an insulation portion, wherein the insulation portion is part of a surface of the rotating shaft and rotates along the rotating shaft, and the motor is further provided with a third connection line in contact with the insulation portion, and when the rotating shaft rotates, the third connection line keeps in contact with the rotating shaft to implement a counting function.

14. The pan-tilt-zoom camera according to claim 13, wherein a contact portion of the third connection line is in contact with an axis of the rotating shaft.

15. The pan-tilt-zoom camera according to claim 1, wherein the camera assembly further comprises a 360-degree detecting device, and the 360-degree detecting device is electrically connected to the control panel to implement 360-degree monitoring; and when the 360-degree detecting device detects an abnormality at an angle, the control panel drives the slide connection apparatus to rotate so as to make the camera align at an abnormal direction.

16. The pan-tilt-zoom camera according to claim 15, wherein the 360-degree detecting device is a panoramic camera, an infrared thermal camera, or a radar.

17. The pan-tilt-zoom camera according to claim 16, wherein the infrared thermal camera or the radar is provided in at least two to implement 360-degree monitoring.

18. The pan-tilt-zoom camera according to claim 1, wherein the top cover and the inner bracket are connected via a transition shell; the screw lamp cap, the top cover, and the circuit board are replaced with a power adapter, and the power adapter is connected to the transition shell to supply power for the camera assembly.

19. A 360-degree surveillance method, wherein the method comprises a step of making a camera assembly electrically connect a camera and a control panel via the slide connection apparatus according to claim 1 to perform rotating surveillance.

* * * * *